United States Patent
Roy

(10) Patent No.: US 8,744,883 B2
(45) Date of Patent: Jun. 3, 2014

(54) SYSTEM AND METHOD FOR LABELING A CONTENT ITEM BASED ON A POSTERIOR PROBABILITY DISTRIBUTION

(75) Inventor: H. Scott Roy, Palo Alto, CA (US)

(73) Assignee: Yahoo! Inc., Sunnyvale, CA (US)

(*) Notice: Subject to any disclaimer, the term of this patent is extended or adjusted under 35 U.S.C. 154(b) by 1909 days.

(21) Appl. No.: 11/642,392

(22) Filed: Dec. 19, 2006

(65) Prior Publication Data
US 2008/0147575 A1 Jun. 19, 2008

(51) Int. Cl.
G06Q 10/00 (2012.01)
G06F 17/30 (2006.01)

(52) U.S. Cl.
USPC ........... 705/7.11; 707/705; 707/706; 707/711

(58) Field of Classification Search
USPC ................... 705/7.11; 707/706, 705, 711
See application file for complete search history.

(56) References Cited

U.S. PATENT DOCUMENTS

| 5,537,488 | A * | 7/1996 | Menon et al. ................ 382/170 |
| 6,161,130 | A * | 12/2000 | Horvitz et al. ............... 709/206 |
| 6,345,265 | B1 * | 2/2002 | Thiesson et al. .............. 706/52 |
| 7,158,983 | B2 * | 1/2007 | Willse et al. .................... 1/1 |
| 7,594,189 | B1 * | 9/2009 | Walker et al. ................. 715/811 |
| 7,644,053 | B2 * | 1/2010 | Kipersztok et al. ............ 706/46 |
| 2004/0054572 | A1 * | 3/2004 | Oldale et al. .................... 705/10 |
| 2004/0059736 | A1 * | 3/2004 | Willse et al. .................. 707/100 |
| 2004/0088308 | A1 * | 5/2004 | Bailey et al. .................. 707/100 |
| 2004/0260695 | A1 * | 12/2004 | Brill .................................. 707/5 |
| 2005/0033678 | A1 * | 2/2005 | Huneault ......................... 705/36 |
| 2005/0165879 | A1 * | 7/2005 | Nikitin et al. .................. 708/805 |
| 2006/0117077 | A1 * | 6/2006 | Kiiveri et al. .................. 708/200 |
| 2006/0206505 | A1 * | 9/2006 | Hyder et al. ................... 707/100 |
| 2008/0109454 | A1 * | 5/2008 | Willse et al. ................... 707/100 |
| 2008/0114564 | A1 * | 5/2008 | Ihara ............................. 702/158 |

OTHER PUBLICATIONS

Robert E. Kass, Luke Tierney, and Joseph B. Kadane, The Validity of Posterior Expansions Based on Laplace's Method, 1990, Elsevier Science Publishers, Bayesian and Likelihood Methods in Statistics and Econometrics.*
Stinson, Catherine Elizabeth, Adaptive Information Filtering with Labeled and Unlabeled Data University of Toronto, 2002.*
Manmatha, R. et al., Modeling Score Distributions for Combining the Outputs of Search Engines ACM SIGIR'01, 2001.*
Rasmussen, C.E. et al., Gaussian Processes for Machine Learning MIT Process, 2006.*
Nigam, Kamal Paul, Using Unlabeled Data to Improve Text Classification Carnegie Mellon University, 2001.*

(Continued)

*Primary Examiner* — Scott L Jarrett
(74) *Attorney, Agent, or Firm* — Pillsbury Winthrop Shaw Pittman LLP

(57) ABSTRACT

The present invention is directed towards systems and methods for the classification or scoring of content items. The method according to one embodiment comprises providing at least one labeled content item as input to an initial classification model, a given labeled item having at least one feature, a given feature being associated with a weight, computing a posterior probability of the initial classification model for the given labeled content item and generating an updated classification model using the initial classification model and the weight associated with the given feature in the given labeled content item. The updated classification model is applied to an unlabeled content item to determine a score for the unlabeled content item.

20 Claims, 4 Drawing Sheets

(56) References Cited

OTHER PUBLICATIONS

Lebanon, Guy et al., Cranking: Combining Rankings Using Conditional Probability Models on Permutations in the Proceedings of the 19th International Conference on Machine Learning, 2002.*

Flinger, Michael A. et al., Posterior Probabilities for Consensus Ordering Psychometrika, vol. 55, No. 1, Mar. 1990.*

Lebanon, Guy et al., Conditional Models on the Ranking Poset Neural Information Procession Systems, 2002.*

Zhang, Jian et al., A Probabilistic Model for Online Document Clustering with Application to Novelty Detection in proceeding of Advances in Neural Information Processing Systems, Dec. 13-18, 2004.*

Peng, Kang et al., Exploiting Unlabeled Data for Improving Accuracy of Predictive Data Mining in Proceedings of the Third IEEE International Conference on Data Mining, Nov. 2003.*

Liu, Bing et al., Partially Supervised Classificaiton of Text Documents Proceedings of IMCL02, 19th International Conference on Machine Learning, 2002.*

* cited by examiner

SYSTEM AND METHOD FOR LABELING A CONTENT ITEM BASED ON A POSTERIOR PROBABILITY DISTRIBUTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to classifying a content item. More specifically, the present invention relates to determining a label for a content item and outputting the content item based on the label.

BACKGROUND OF THE INVENTION

To increase utility, machines, such as computers, are called upon to classify or organize content items to an ever increasing extent. For example, some classification methods referred to as "machine learning algorithms" are used to organize content items into a predefined structure based on attributes thereof or external parameters. The classification methods may also be used to route the content items to appropriate individuals (e.g., users on a network) and/or locations (e.g., in a computer memory, in a communications network, etc.). For example, an information service, such as a web portal, may implement the classification methods to classify and provide customized delivery of the content items to users. That is, a user may register with the web portal and indicate an interest in the New York Mets®. Using the classification methods, the web portal may identify and select the content items available on the Internet, such as news stories, product offers, etc., which are related to the Mets and deliver the selected content items to the user.

Similarly, the classification methods may be used to filter out undesired content. Unwanted and/or unsolicited email ("spam") is generally a nuisance, using storage space and potentially delivering harmful content (e.g., viruses, worms, Trojan horses, etc.). If the user is required to manually filter the spam from the desired content, the user may not register with the web portal. If users refrain from using the web portal, a total audience size may shrink and, ultimately, a decrease in advertising and/or partnership revenue may occur. Thus, the web portal may implement the classification methods to identify and filter out the spam.

Due to an ever-increasing amount of content available on the Internet (and in private networks) and a desire by users to have the presentation of customized content and network interfaces, there exists a need for efficient and accurate classification methods.

SUMMARY OF THE INVENTION

The present invention is directed towards systems and methods for scoring or otherwise classifying a content item. According to one embodiment, the method comprises providing a prior probability distribution that is a normal distribution, a likelihood function and a labeled content item as input to a scoring component. A posterior probability distribution is constructed that is a normal distribution, the posterior probability distribution approximating the product of the likelihood function and the prior probability distribution. The posterior probability distribution is applied to a content item in a result set returned from a search component to determine a score for the content item. A training set comprising a plurality of labeled content items may be utilized by the method.

Construction of the posterior probability distribution may comprise computing a peak and a second derivative of the product and applying a Laplace approximation to the peak and the second derivative to obtain the normal distribution. Construction may also comprise representing the likelihood function as an axis of symmetry in a solution space with the normal distribution, generating a further normal distribution by rescaling, using a transformation function, the normal distribution to have an equal standard deviation in all directions about a peak thereof and generating a further axis of symmetry using the transformation function. A maximum of the product is determined on a solution line intersecting the rescaled further normal distribution and the further axis of symmetry. The solution line may be formed along a diameter of the rescaled further normal distribution and perpendicular to the further axis of symmetry.

A system according to one embodiment of the invention comprises a scoring component that receives a prior probability distribution that is a normal distribution, a likelihood function and a labeled content item as input to the scoring component and constructs a posterior probability distribution that is a normal distribution, the posterior probability distribution approximating the product of the likelihood function and the prior probability distribution. A search component receives the posterior probability distribution for application to a content item in a result set to determine a score for the content item. The scoring component may assemble a training set of a plurality of labeled content items.

The scoring component may compute a peak and a second derivative of the product and apply a Laplace approximation to the peak and the second derivative to obtain the normal distribution. The scoring component may also represent the prior probability distribution as a normal distribution, represent the likelihood function as an axis of symmetry in a solution space with the normal distribution, generate a further normal distribution by rescaling the normal distribution to have an equal standard deviation in all directions about a peak thereof through the use of a transformation function, generate a further axis of symmetry using the transformation function and determine a maximum of the product on a solution line intersecting the rescaled further normal distribution and the further axis of symmetry. The scoring component may form the solution line along a diameter of the rescaled further normal distribution and perpendicular to the further axis of symmetry.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of the preferred embodiments, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
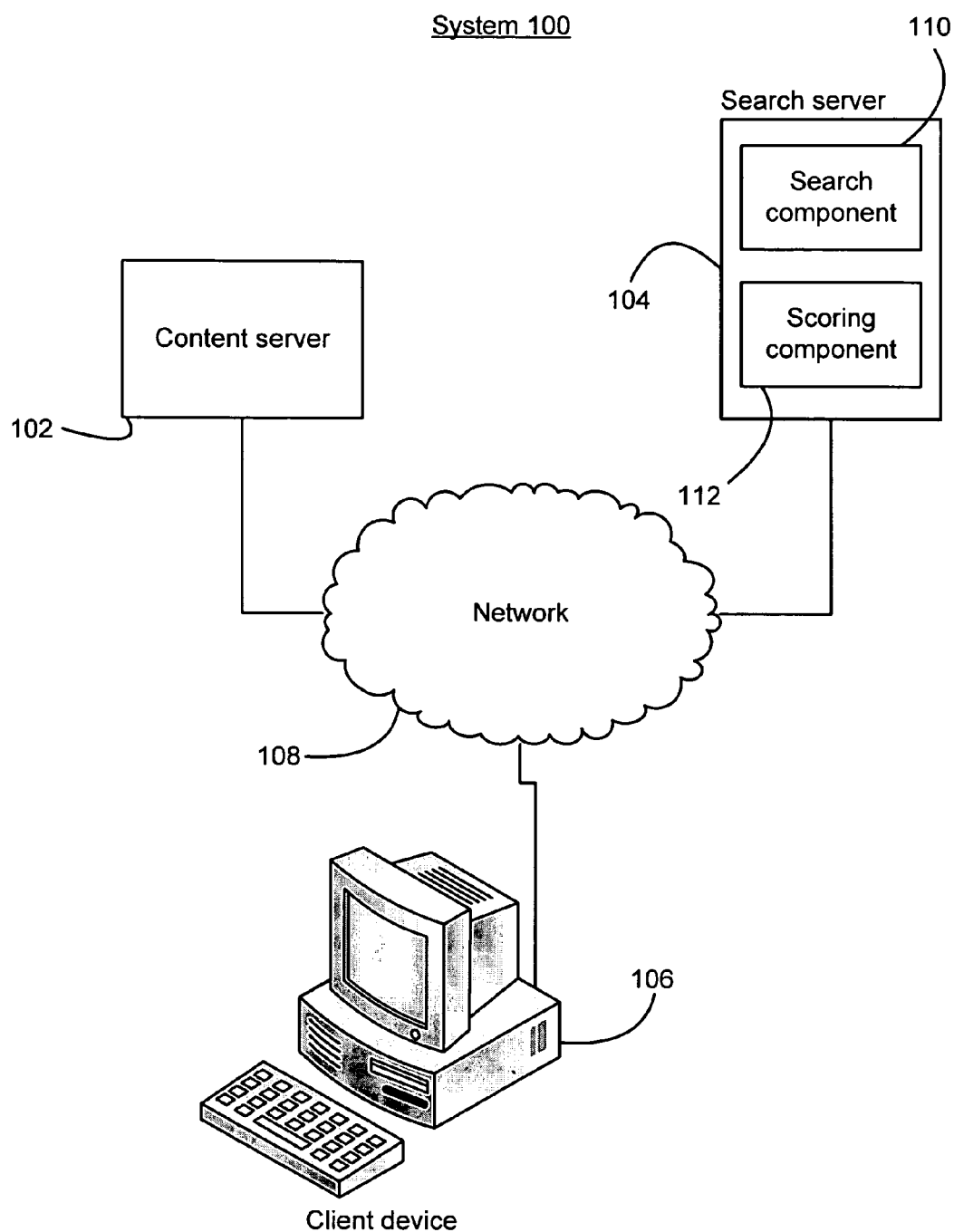
FIG. 1 shows an exemplary embodiment of a system for classifying a content item according to one embodiment of the present invention.

FIG. 1 shows an exemplary embodiment of a system 100 for classifying a content item according to the present invention. The system 100 may comprise a content server 102, a search server 104 and a client device 106 which are communicatively interconnected via a communications network 108 (e.g., a wired/wireless LAN/WAN, a cellular network, the Internet, an intranet, a VPN, a PSTN, etc.). The content and search servers 102, 104 and the client device 106 may be processor-based computing devices which include memory and network connection ports for communicating data on the network 108. For example, the client device 106 may be a PC, laptop, mobile phone, PDA, tablet computer, handheld computer, smart appliance (e.g., scanner, copier, facsimile machine), etc. which utilizes a web browser (or command-line interface) for allowing a user to interface with devices on the network 108. Those of skill in the art understand that any number of client devices 106 may be connected to the network 108.

In the exemplary embodiment of FIG. 1, the content server 102 maintains content items (e.g., audio, video, image and text content items, as well as combinations thereof) and makes the content items available to devices on the network 108. In other exemplary embodiments, the content items may be stored on databases coupled to the network 108 or directly to the search server 104, the client device 106, other networked devices, etc. The content items may include text data, video data or audio data and be embodied as, for example, web pages, emails, advertisements, news stories, digital videos, digital music, etc. For example, the content server 102 may be operated by a news organization and host a website for the news organization which transmits and contains links to the content items. As understood by those of skill in the art, the system 100 may include any number of content servers 102 connected to the search server 104 directly or via the network 108.

The search server 104 may be operated by a web portal company (e.g., Yahoo!, Inc.®) and host a web portal including services such as a search engine, email, news, bulletin boards, online shopping, fantasy sports, P2P messenger, etc. As understood by those of skill in the art, the web portal may generate and provide original content items in conjunction with the content items that the content server 102 maintains. According to one exemplary embodiment, the news organization may have an agreement with the web portal company allowing the web portal to provide links, RSS feeds, etc. to the content items that the content server 102 maintains.

The search server 104 may differentiate between visitors thereto as unregistered visitors and registered visitors in terms of services provided and/or restrictions on access to predefined content items or groups thereof. For example, the registered and unregistered visitors may have access to the search engine and the bulletin boards, and the registered visitors may have further access to a personal email account, authorization for online shopping, a customized version of the web portal, restricted content, etc. The customized version of the web portal may provide, for example, new stories about topics for which a registered visitor indicated interest, online shopping offers for products about which the registered visitor has indicated interest (e.g., via browsing history, related purchases, etc.), access to otherwise restricted content, etc.

To provide the customized version of the web portal or a list of search result(s), the search server 104 may implement a search component 110 (e.g., crawler, spider) for identifying the content items and a scoring component 112 for determining whether the content items relate to one or more of the interests of the visitor. The interests of a given user may be determined using search parameter data obtained from, for example, user input, web cookies, web browser history, data on the client device 106, etc.

In the exemplary embodiment, the scoring component 112 utilizes a machine learning algorithm that extracts rules or patterns from a training set of labeled content items to generate and optimize a classification model that may be used to classify unlabeled content items. After scoring the unlabeled content items, the search server 104 may determine whether to output the unlabeled content items as search results. That is, when searching over and scoring a plurality of the unlabeled content items, the scoring component 112 may apply a score to one or more unlabeled content items. The search server 104 may use these scores to order the content items, to filter them, or to otherwise annotate them. For example, it may highlight all content items that have a score above a certain threshold. The scoring component 112 may be embodied in hardware, software or combinations thereof. For example, the scoring component 112 may comprise one or more instructions stored on a computer-readable media, and a processor in the search server 104 may execute the instructions.

As noted above, the scoring component 112 utilizes the training set of labeled content items $(x_1 \ldots x_n)$ that have been labeled with either a 1 or a 0 to generate and optimize ("train") a classification model. As understood by those of skill in the art, the training set may be compiled by, for example, manually labeling a given content item, x, using visitor feedback or confirmation, using histograms on previous searches, etc. Alternatively, or in conjunction with the foregoing, the training set may be compiled by observing the past actions of a given user and inferring the labels from his or her actions. A given content item may be described by one or more features, f which may comprise a numerical feature vector $(f_1 \ldots f_m)$. For example, if a given content item is a news story, the features f may be indicative of source, author, age of story, topics, etc. Thus, the features f in an exemplary labeled content item x may be:

SOURCE_nyt
AUTHOR_george_vecsey
AGE_IN_HOURS=14
TOPIC_yankees
TOPIC_world_series In the above example, the features f without an explicit numerical value have a value of 1. Other features f that are not associated with the content item have the value of 0. For example, in the above exemplary labeled content item, the feature TOPIC_cubs may not be identified therein and thus has the value of 0. Those of skill in the art understand that the training set may include any number of labeled content items that have any number of features with values other than zero.

In the exemplary embodiment, the scoring component 112 may be implemented as a probabilistic classifier which utilizes Bayes' Theorem, illustrated in Equation (1):

$$Pr(M|DI) = \frac{Pr(D|MI)Pr(M|I)}{Pr(D|I)} \quad (1)$$

As is known in the art, Bayes' Theorem describes the computation of a posterior probability Pr(M|DI) of a model M given data D by analyzing a product of a likelihood function Pr(D|MI) for the data D given the model M and a prior probability distribution Pr(M|I). Prior information I represents information known before any of the data D is received. According to one embodiment, the probability Pr(D|I) of the data D given the prior information I is utilized as a normalizing constant and remains fixed. The exemplary embodiments of the present invention determine a maximum for the product in the numerator of Equation (1) to identify the model M that maximizes the probability of the model M given the data D. In the exemplary embodiment, the training set is used for the data D and specific choices are made for the likelihood function and the prior probability distribution that allow the posterior probability of the model M to be approximated accurately, which may also comprise minimizing computational time and resources.

The likelihood function represents a probability that the data D would have been observed given the model M and may be represented as a linear logistic regression model as shown in Equation (2):

$$Pr(x = 1|MI) = \frac{1}{1 + \exp(-\sum w_i f_i)} \quad (2)$$

where
$w_i$ is a weight assigned to a feature $f_i$ for each feature f in the content item x.

The regression model above represents the probability that the content item x should be labeled with a value of 1 given the model M. A summing operation may be computed for one or more of the features $f_i$ included in the labeled content item x. However, in applications where the potential number of the features f is very large (e.g., above a predetermined threshold), the summing operation may be organized so that only the features having non-zero values are used as input thereto. In the example of the news story described above, one of skill in the art may organize the computation so that the analysis only considers the five non-zero features.

In a further exemplary embodiment, a baseline feature may be utilized, which has a value of 1 for every item. The baseline feature effectively adds an additional weight, $w_{baseline}$, for items in Equation (2) to thereby account for the relative proportion of the labeled content items having labels of 0 and 1.

When the weights $w_i$ associated with the features $f_i$ for a content item x are positive, the exponent in the denominator is negative, and the probability that the labeled content item x should be labeled with a value of 1 given the model M and the prior information I approaches 1. In contrast, when the weights $w_i$ are negative, the exponent will be positive and the probability approaches 0. When the sum of the weights $w_i$ is 0, the probability is 0.5.

Those of skill in the art understand that when the labeled content item has a value of 0, the likelihood function is represented as Pr(x=0|MI)=1−Pr(x=1|MI), and the sign of the exponent in Equation (2) is reversed. In this instance, when the weights associated with the features for the labeled content item are positive, the exponent in the denominator is positive and the probability that the content item x should be labeled with a 0 given the model M and the prior information I approaches 0. In contrast, when the weights $w_i$ are negative, the exponent will be negative and the probability approaches 1. If the sum of the weights $w_i$ is 0, then the probability is 0.5. Thus, the probabilities Pr(x=1|MI) and Pr(x=0|MI) together comprise the likelihood function for an unlabeled content item x.

The prior probability distribution Pr(M|I) may be modeled as a multivariate normal distribution over all possible values for the weights $w_i$. In the exemplary embodiment, the prior probability distribution uses a mean $\mu_i$ and a standard deviation $\sigma_i$ for a given weight $w_i$. Those of skill in the art understand, however, that it is also possible to include correlation terms $\sigma_{ij}$. The multivariate normal distribution may be computed according to Equation (3):

$$Pr(dw_i|I) = \frac{1}{\sqrt{2\pi}\,\sigma_i} \exp -\frac{1}{2}\left(\frac{w_i - \mu_i}{\sigma_i}\right)^2 \quad (3)$$

Equation (3) illustrates one embodiment of a probability density that a selected weight $w_i$ has a particular given value. The probability density is a normal distribution centered on the mean $\mu_i$ and having the standard deviation $\sigma_i$. Thus, in the exemplary embodiment, a state of knowledge relevant for a given content item x has 2m parameters: the mean $\mu_i$ and the standard deviation $\sigma_i$ for each non-zero feature.

In making predictions using the Equation (2) above, the exemplary embodiment uses weight $w_i$ equal to the mean $\mu_i$, because this weight is the most probable value. Those of skill in the art understand, however, that a more exact probability may be computed by summing over several possible weights.

Figure 2:
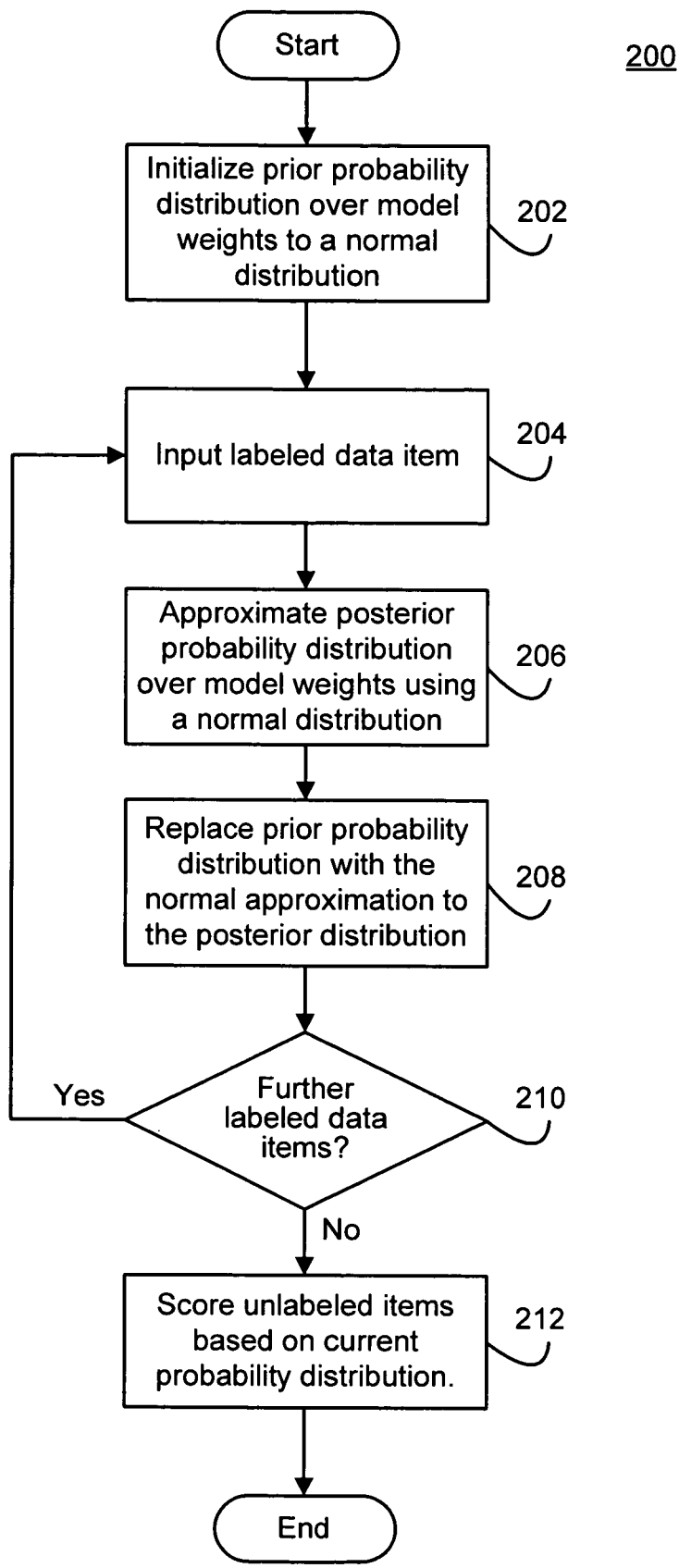
FIG. 2 shows an exemplary embodiment of a method for classifying a content item according to one embodiment of the present invention.

FIG. 2 illustrates an exemplary embodiment of a method 200 for generating and updating the probability distribution over model weights according to one embodiment of the present invention. In step 202, a prior probability distribution is constructed using formula (2). The prior probability distribution may be described by $\mu_i$ and $\sigma_i$ for i=1 . . . m for weights $w_i$ for one or more features $f_i$ in a first labeled content item $x_1$. In an instance where the prior information I is null or unavailable (or the learning is being reset or otherwise reinitialized), the mean $\mu_i$ may be initialized to $\mu_i$=0 and the standard deviation may be initialized to $\sigma_i$=1. As understood by those of skill in the art, initializing the $\mu_i$=0 and the $\sigma_i$=1 may reflect a standard normal distribution (e.g., a bell curve).

In step 204, the labeled content item $x_1$ (and the means $\mu_i$ and the standard deviations $\sigma_i$ for the one or more features therein) is input into the learning algorithm. In step 206, the posterior probability of the model weights is computed. As described above, the posterior probability is proportional to the product of the likelihood function (e.g., Equation (2)) and the prior probability distribution (e.g., Equation (3)). Bayes' Theorem shows that the product is a function, $g(w_1 \ldots w_m)$, that is proportional to the posterior probability of the weights w given the first labeled content item $x_1$. In general, this function g( ) is not a normal distribution. In one exemplary embodiment, the method approximates this function g( ) with a normal distribution by computing the peak of the function g( ) and its second derivative and then applying the standard statistical Laplace approximation.

In step 208, an updated probability distribution over model weights may be generated by substituting a new mean $\mu_i$ and a new standard deviation $\sigma_i$ determined from the normal approximation. In step 210, it is determined whether further labeled content items remain in the training set. If further labeled content items remain, one or more may be used to update the posterior probability again using those items, step 204. Thus, when the training set is empty, the current probability distribution may be applied to an unlabeled content item, as shown in step 212. That is, based on one or more of the features identified in the unlabeled content item, the system generates a probability that the unlabeled content item should have a label of 0 or 1. The exemplary embodiment does this by picking the model of maximum probability, where each weight $w_i$ is equal to the mean $\mu_i$ in the current probability distribution, and then using Equation (2). Those of skill in the art understand that any of the initial and updated probability distributions may be applied to an unlabeled content item at any time. Thus, the classification system may classify unlabeled content items while it is being trained and before it finishes iterating over each of the labeled content items in the training set.

Figure 3:
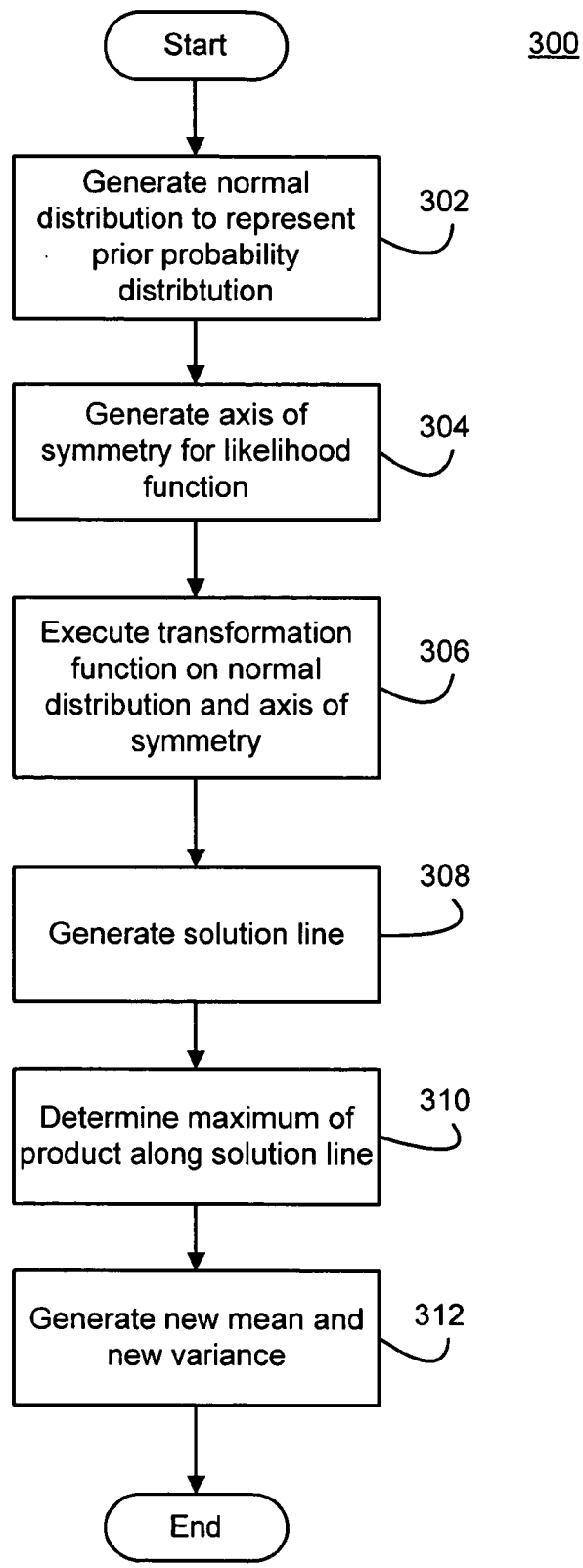
FIG. 3 shows an exemplary embodiment of a method for updating a classification model according to one embodiment of the present invention.
Figure 4A:
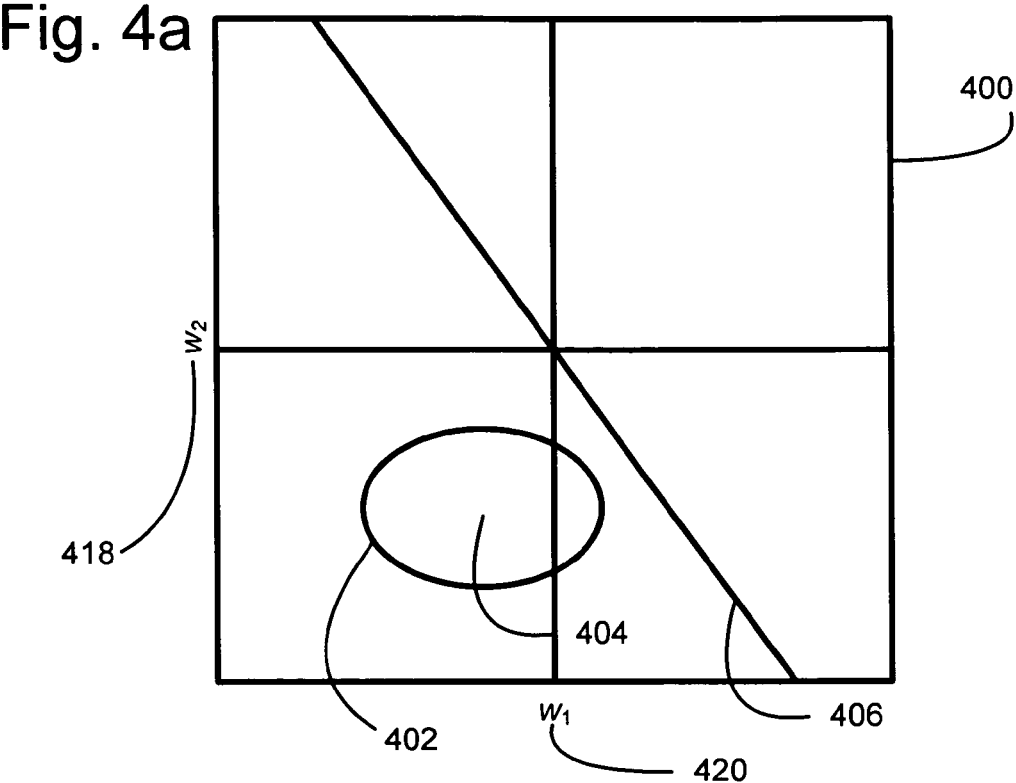
FIG. 4a shows an exemplary embodiment of a two-dimensional solution space for a classification problem according to one embodiment of the present invention.

FIG. 3 illustrates one embodiment of a method 300 for approximating the function g( ) with a normal distribution (which may correspond to step 206 in method 200 of FIG. 2). This method is linear in a number of non-zero features $f_i$ for content item $x_i$. In step 302, a normal distribution is generated to represent a prior probability distribution. As shown in FIG. 4a, a two-dimensional contour plot 400 depicts the numerical solution in an example where there are two weights $w_1$ 418 and $w_2$ 420. An ellipse 402 may represent the normal distribution generated using the probability density distribution shown in Equation (3), and a peak 404 of the ellipse 402 is located at a center thereof. While the exemplary embodiment is described with reference to the two weights $w_1$ and $w_2$, those of skill in the art understand that the method 300 may be implemented for any number of weights.

In step 304, an axis of symmetry is computed for the likelihood function. FIG. 4a shows a diagonal line 406 representing the axis of symmetry when the sum of the weights $w_i$ for one or more features in a labeled content item equals 0 (e.g., $\Sigma w_i f_i = 0$).

Figure 4B:
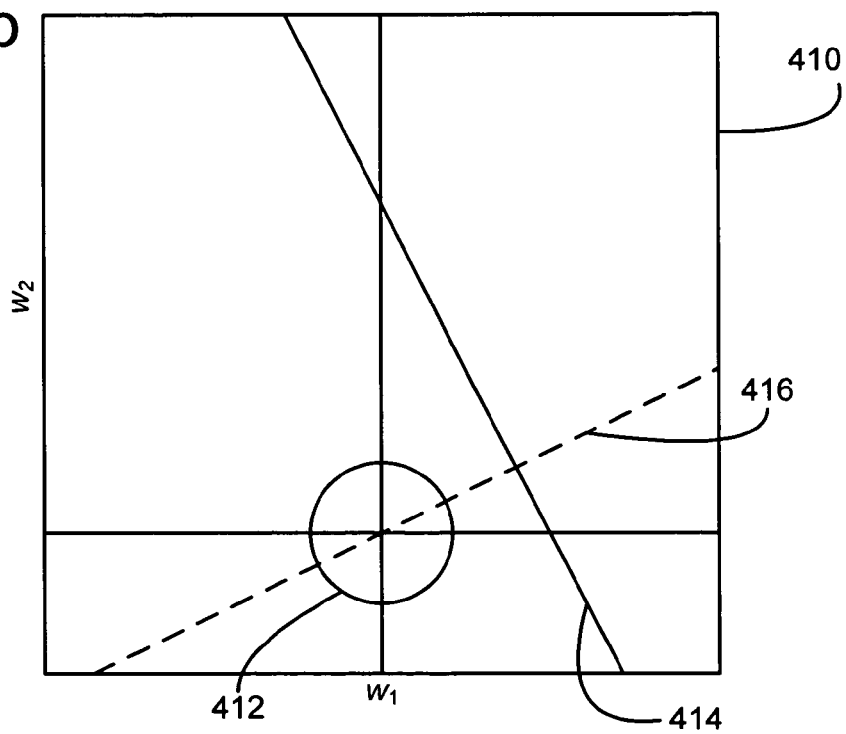
FIG. 4b shows an exemplary embodiment of a transformed two-dimensional solution space for a classification problem according to one embodiment of the present invention.

In step 306, a transformation function may rescale the weights $w_1$ and $w_2$ so that the normal distribution has an equal standard deviation in each direction around the peak. As part of this transformation, the origin is also translated to the peak of the normal distribution. As shown in FIG. 4b as an exemplary two-dimensional contour plot 410, the normal distribution is represented as a circle 412. This transformation is linear, step 308. Accordingly, the axis of symmetry for the likelihood function, 406, is transformed into a new line 414. Traveling perpendicular to the solution line 416, a value of the likelihood function remains constant while a value of the prior probability function decreases. Hence, the line 414 is a ridge of the function g( ), and the values of $w_1$ and $w_2$ that maximize g( ) must lie along this line.

In step 310, a maximum of the product of the likelihood function and the prior probability distribution is determined along the solution line 416. In determining the maximum of the product, a value z is identified that maximizes Equation (4):

$$h(z) = -\frac{1}{2}az^2 - \log(1 + \exp(-s)) \quad (4)$$

$$a = \sum f_i^2 \sigma_i^2$$

$$b = \sum f_i \mu_i$$

$$s = \pm(az + b)$$

The sign of s is positive if the content item x is labeled 1, and is negative if it is labeled 0. The function h(z) is proportional to the log of the product of the likelihood function and the prior probability distribution along the solution line 416. Thus, a given value of z corresponds to a point on the solution line 416. Finding the maximum of the function h(z) is a one-dimensional numerical optimization that is solved using, for example, Newton's method (e.g., finding a zero of a first derivative of h(z)). Therefore, the embodiment that Equation (4) illustrates reduces the computational complexity to a single one dimensional optimization for a given training item.

In step 312, a new mean $\mu_i'$ and a new standard deviation $\sigma_i'$ may be computed for updating the initial (or an updated) classification model. The new mean $\mu_i'$ and standard deviation $\sigma_i'$ may be calculated as follows:

$$\mu_i' \leftarrow \mu_i + f_i \sigma_i^2 z;$$

$$\sigma_i' \leftarrow \left(\frac{1}{\sigma_i^2} + f_i^2 \frac{\exp(s)}{(1 + \exp(s))^2}\right)^{-\frac{1}{2}}$$

The new mean $\mu_i'$ and the new standard deviation $\sigma_i'$ may be utilized to generate the updated (or current for the last labeled content item x) classification model (e.g., step 208 in method 200).

Referring back to FIG. 2, an unlabeled content item, x', may be input into the model for classification. From the above description of the exemplary embodiments, those of skill in the art will understand that the present invention provides a fast and accurate method/algorithm for classifying the unlabeled content items x', as well as for learning from new labeled training items. As explained above, the current classification model may be useful for returning search results for a search string entered into a network search engine. Additionally, the current classification model may be utilized in automatic searches conducted by, for example, the search server 104 based on indicated interests of the registered visitors.

FIGS. 1 through 4b are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method, implemented on a machine having at least one processor, storage, and a communication platform connected to a network for determining a label for a content item, comprising:

obtaining one or more labeled content items each associated with a label;

determining a model, by the at least one processor, based on the one or more labeled content items and a posterior probability distribution, wherein:

the posterior probability distribution is determined based on a product of a likelihood function and a prior probability distribution that is a first normal distribution determined based on the one or more labeled content items, the posterior probability distribution is transformed to a second normal distribution based on a transformation function, a first axis of symmetry for the likelihood function is transformed to a second axis of symmetry based on the transformation function, and the posterior probability distribution is determined based on the second axis of symmetry; and determining a label for an unlabeled content item, based on the model.

2. The method according to claim 1, wherein the one or more labeled content items comprise a training set of one or more labeled content items having a label with either 1 or 0 based on manually labeling using histograms on one or more previous searches.

3. The method according to claim 1, further comprising:

computing a peak and a second derivative of the product; and applying a Laplace approximation to the peak and the second derivative to obtain the second normal distribution.

4. The method according to claim 1, further comprising:

representing the likelihood function as the first axis of symmetry in a solution space with the first normal distribution;

generating the second normal distribution by rescaling, using the transformation function, the first normal distribution to have an equal standard deviation in all directions about a peak thereof;

generating the second axis of symmetry using the transformation function; and determining a maximum of the product on a solution line intersecting the rescaled second normal distribution and the second axis of symmetry.

5. The method according to claim 4, wherein the solution line is electronically formed along a diameter of the rescaled second normal distribution and perpendicular to the second axis of symmetry.

6. The method according to claim 1, comprising annotating the unlabeled content item based on a score of the unlabeled content item by highlighting the content item that is scored above a threshold.

7. The method according to claim 1, wherein the one or more labeled content items comprise one or more features, wherein the one or more features comprise at least two of a source, an author, and an age of a news story and the one or more features comprise one or more numerical feature vectors.

8. The method according to claim 1, comprising modifying the likelihood function using a baseline feature.

9. The method according to claim 7, summing the one or more features having non-zero values associated therewith.

10. The method according to claim 4, comprising computing a mean and standard deviation; and updating the prior probability distribution with the computed mean and standard deviation.

11. A system, comprising:
at least one processor-based computing device, the at least one processor-based computing device operative at least to:
obtain one or more labeled content items each associated with a label;
determine a model, based on the one or more labeled content items and a posterior probability distribution, wherein:
the posterior probability distribution is determined based on a product of a likelihood function and a prior probability distribution that is a first normal distribution determined based on the one or more labeled content items,
the posterior probability distribution is transformed to a second normal distribution based on a transformation function,
a first axis of symmetry for the likelihood function is transformed to a second axis of symmetry based on the transformation function, and
the posterior probability distribution is determined based on the second axis of symmetry; and
determine a label for an unlabeled content item, based on the model.

12. The system according to claim 11, wherein the one or more labeled content items comprise a training set of one or more labeled content items having a label with either 1 or 0 based on manually labeling using histograms on one or more previous searches.

13. The system according to claim 11, the at least one processor-based computing device operative to compute a peak and a second derivative of the product and apply a Laplace approximation to the peak and the second derivative to obtain the second normal distribution.

14. The system according to claim 11, the at least one processor-based computing device operative to represent the prior probability distribution as the first normal distribution, represent the likelihood function as the first axis of symmetry in a solution space with the first normal distribution, generate the second normal distribution by rescaling the first normal distribution to have an equal standard deviation in all directions about a peak thereof through the use of a transformation function, generate the second axis of symmetry using the transformation function and determine a maximum of the product on a solution line intersecting the rescaled second normal distribution and the second axis of symmetry.

15. The system according to claim 11, the at least one processor-based computing device operative to annotate the unlabeled content item based on a score of the unlabeled content item by highlighting the content item that is scored above a threshold.

16. The system according to claim 11, wherein the one or more labeled content items comprise one or more features, wherein the one or more features comprise at least two of source, author, and age of a news story and the one or more features comprise one or more numerical feature vectors.

17. The system according to claim 16, the at least one processor-based computing device operative to sum the one or more features having non-zero values associated therewith.

18. The system according to claim 11, the at least one processor-based computing device operative to modify the likelihood function using a baseline feature.

19. The system according to claim 14, the at least one processor-based computing device operative to form the solution line along a diameter of the rescaled second normal distribution and perpendicular to the second axis of symmetry.

20. The system according to claim 14, the at least one processor-based computing device operative to compute a mean and standard deviation; and update the prior probability distribution with the computed mean and standard deviation.

* * * * *